(12) United States Patent
Katayama et al.

(10) Patent No.: US 10,272,782 B2
(45) Date of Patent: Apr. 30, 2019

(54) VEHICLE DISPLAY DEVICE

(71) Applicant: YAZAKI CORPORATION, Tokyo (JP)

(72) Inventors: Yasushi Katayama, Shizuoka (JP); Kyouichi Nagaoka, Shizuoka (JP); Masanobu Terao, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/202,209

(22) Filed: Jul. 5, 2016

(65) Prior Publication Data

US 2017/0210228 A1  Jul. 27, 2017

Related U.S. Application Data

(60) Provisional application No. 62/281,847, filed on Jan. 22, 2016.

(51) Int. Cl.
| | |
|---|---|
| *B60K 35/00* | (2006.01) |
| *G09G 5/26* | (2006.01) |
| *G09G 3/36* | (2006.01) |
| *G09G 3/20* | (2006.01) |
| *G09G 5/32* | (2006.01) |
| *G01P 3/489* | (2006.01) |
| *G06F 3/147* | (2006.01) |

(52) U.S. Cl.
CPC .............. *B60K 35/00* (2013.01); *G01P 3/489* (2013.01); *G06F 3/147* (2013.01); *G09G 3/2096* (2013.01); *G09G 3/36* (2013.01); *G09G 5/26* (2013.01); *G09G 5/32* (2013.01); *B60K 2350/106* (2013.01); *B60K 2350/1076* (2013.01); *B60K 2350/901* (2013.01); *G09G 2340/045* (2013.01); *G09G 2340/0464* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 4,108,103 | A * | 8/1978 | Ammar | G01P 1/08 116/271 |
| 5,659,290 | A * | 8/1997 | Haeri | B60Q 1/54 340/439 |
| 6,633,811 | B1 * | 10/2003 | Aumayer | B60K 31/185 180/170 |
| 9,108,519 | B2 | 8/2015 | Tamaki et al. | |
| 2003/0164757 | A1 * | 9/2003 | Hayashi | B60K 35/00 340/441 |
| 2003/0221606 | A1 * | 12/2003 | Quigley | G01P 1/08 116/286 |

(Continued)

*Primary Examiner* — Curtis J King
(74) *Attorney, Agent, or Firm* — Kenealy Vaidya LLP

(57) ABSTRACT

A vehicle display device includes a digital display configured to display together a first integer value representing travel speed in kilometers per unit time and a second integer value representing travel speed in miles per unit time, and a controller configured to perform, at a time the second integer value is zero and the first integer value is positive, one of a correction to set the first integer value to zero and a correction to set the second integer value to a positive value, and display the first integer value and the second integer value on the digital display.

5 Claims, 11 Drawing Sheets

(56) References Cited

U.S. PATENT DOCUMENTS

| | | | |
|---|---|---|---|
| 2005/0166830 A1* | 8/2005 | Wylin | G01P 1/07 116/62.1 |
| 2007/0090939 A1* | 4/2007 | Takato | B60K 35/00 340/461 |
| 2008/0141927 A1* | 6/2008 | Takeshige | B60K 37/02 116/62.4 |
| 2008/0198042 A1* | 8/2008 | Quigley | B60K 35/00 340/988 |
| 2008/0211652 A1* | 9/2008 | Cope | B60K 35/00 340/461 |
| 2009/0284363 A1* | 11/2009 | Havins | B60K 35/00 340/461 |
| 2015/0312863 A1* | 10/2015 | Shen | G01S 19/34 455/574 |

\* cited by examiner

VEHICLE DISPLAY DEVICE

CROSS-REFERENCE TO RELATED APPLICATION(S)

The present application claims priority to and incorporates by reference the entire contents of U.S. Patent Application No. 62/281,847 filed in the United States on Jan. 22, 2016.

BACKGROUND OF THE INVENTION

1. Field of the Invention

The present invention relates to a vehicle display device.

2. Description of the Related Art

The conventional display device displays the traveling speed of a vehicle in one of two different units. For example, U.S. Pat. No. 9,108,519 discloses the technology of a meter display device of an electronic vehicle, which displays a vehicle speed in one of miles per hour (mph) and kilometers per hour (km/h).

It is possible to achieve improved convenience for a user by displaying values of the traveling speed in two different units together in a vehicle display device. However, it is preferable to reduce discomfort caused to the user when the two values of the traveling speed are displayed. For example, when display contents and a display mode of the two speed values are inappropriate, the user potentially feels uncomfortable and discomfort.

SUMMARY OF THE INVENTION

It is an object of the present invention to provide a vehicle display device that displays together values of a traveling speed in two different units while achieving reduced discomfort caused to the user.

To achieve the above-described objective, a vehicle display device according to one aspect of the present invention includes a digital display configured to display together a first integer value representing travel speed in kilometers per unit time and a second integer value representing travel speed in miles per unit time; and a controller configured to perform, at a time the second integer value is zero and the first integer value is positive, one of a correction to set the first integer value to zero and a correction to set the second integer value to a positive value, and display the first integer value and the second integer value on the digital display.

According to another aspect of the present invention, in the vehicle display device, it is preferable that the controller is configured to correct the first integer value to zero at the time the second integer value is zero and the first integer value is positive.

According to still another aspect of the present invention, in the vehicle display device, it is preferable that the controller is configured to correct the second integer value to a value identical to the first integer value at the time the second integer value is zero and the first integer value is positive.

According to still another aspect of the present invention, in the vehicle display device, it is preferable that the controller is configured to cause the digital display to display one of the first integer value and the second integer value in a character size larger than a character size of an other of the first integer value and the second integer value.

According to still another aspect of the present invention, in the vehicle display device, it is preferable that the controller is configured to correct an integer value out of the first integer value and the second integer value, which is displayed in a smaller character size, to a value identical with an integer value displayed in a larger character size at the time the second integer value is zero and the first integer value is positive.

A vehicle display device according to still another aspect of the present invention includes a digital display configured to display together a first speed value in kilometers per unit time and a second speed value in miles per unit time; and a controller configured to display, at a time when one of the first speed value and the second speed value is equal to or larger than a maximum value of a speed range, the one of the first speed value and the second speed value in a display mode different from a display mode when the one of the first speed value and the second speed value is smaller than the maximum value.

According to still another aspect of the present invention, in the vehicle display device, it is preferable that the controller is configured to cause the digital display to display one of the first speed value and the second speed value in a character size larger than a character size of an other of the first speed value and the second speed value.

A vehicle display device according to still another aspect of the present invention includes a digital display configured to display together a first speed value in kilometers per unit time and a second speed value in miles per unit time, the digital display configured to switch a main display target between the first speed value and the second speed value; and a controller configured to switch the main display target on the digital display between the first speed value and the second speed value while maintaining a relative positional relation between a display position of the first speed value and a display position of the second speed value.

According to still another aspect of the present invention, in the vehicle display device, it is preferable that the controller is configured to cause the display to display one of the first speed value and the second speed value as a main display target and in a character size larger than a character size of an other of the first speed value and the second speed value.

According to still another aspect of the present invention, in the vehicle display device, it is preferable that the relative positional relation between the display position of the first speed value and the display position of the second speed value is the display position of the first speed value always being located above the display position of the second speed value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a vehicle display device according to embodiments of the present invention in detail with reference to the accompanying drawings. The present invention is not limited to these embodiments. Components in the following embodiments include those easily thought of by the skilled person in the art or those effectively identical to the components.

First Embodiment

Figure 1:
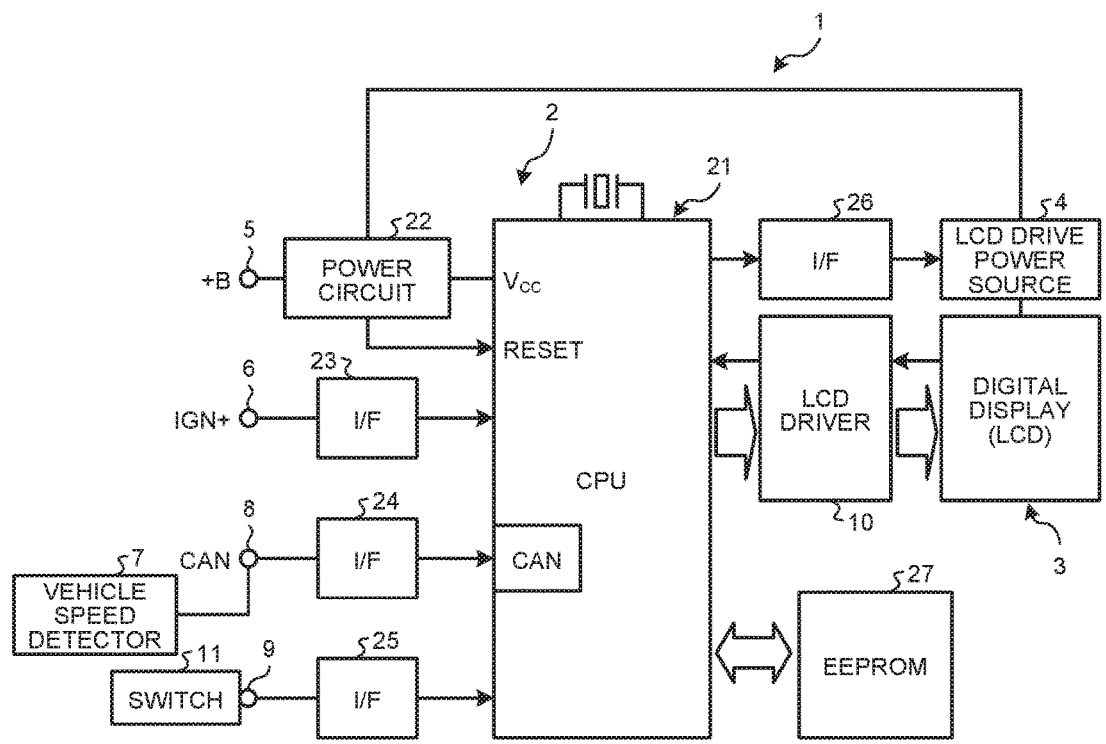
FIG. 1 is a schematic configuration diagram of a vehicle display device according to a first embodiment.
Figure 2:
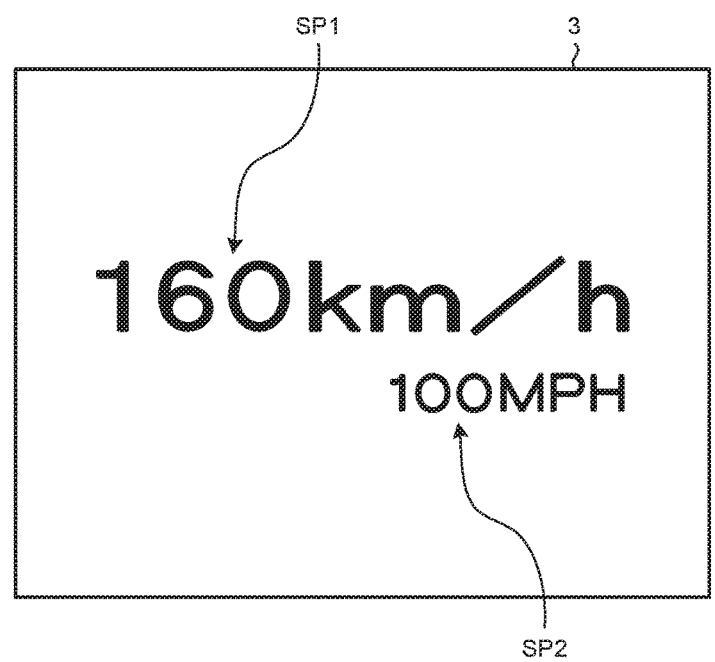
FIG. 2 is a diagram illustrating that the vehicle display device according to the first embodiment displays values of a speed together.
Figure 3:
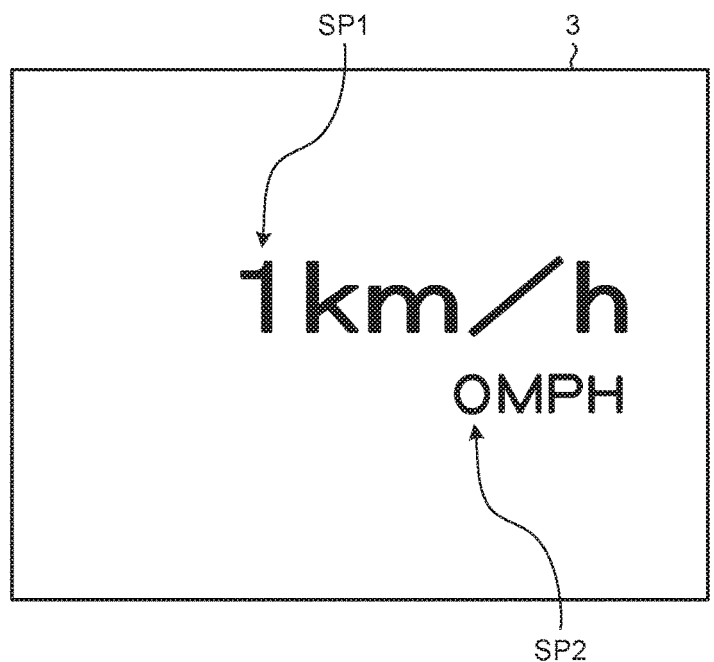
FIG. 3 is an explanatory diagram of speed display that is likely to cause discomfort.
Figure 4:
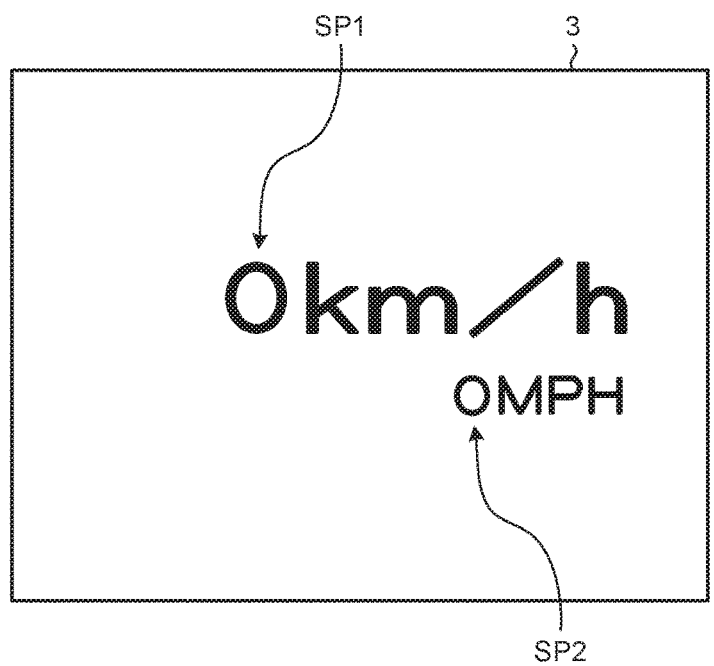
FIG. 4 is a diagram illustrating exemplary unified speed display according to the first embodiment.
Figure 5:
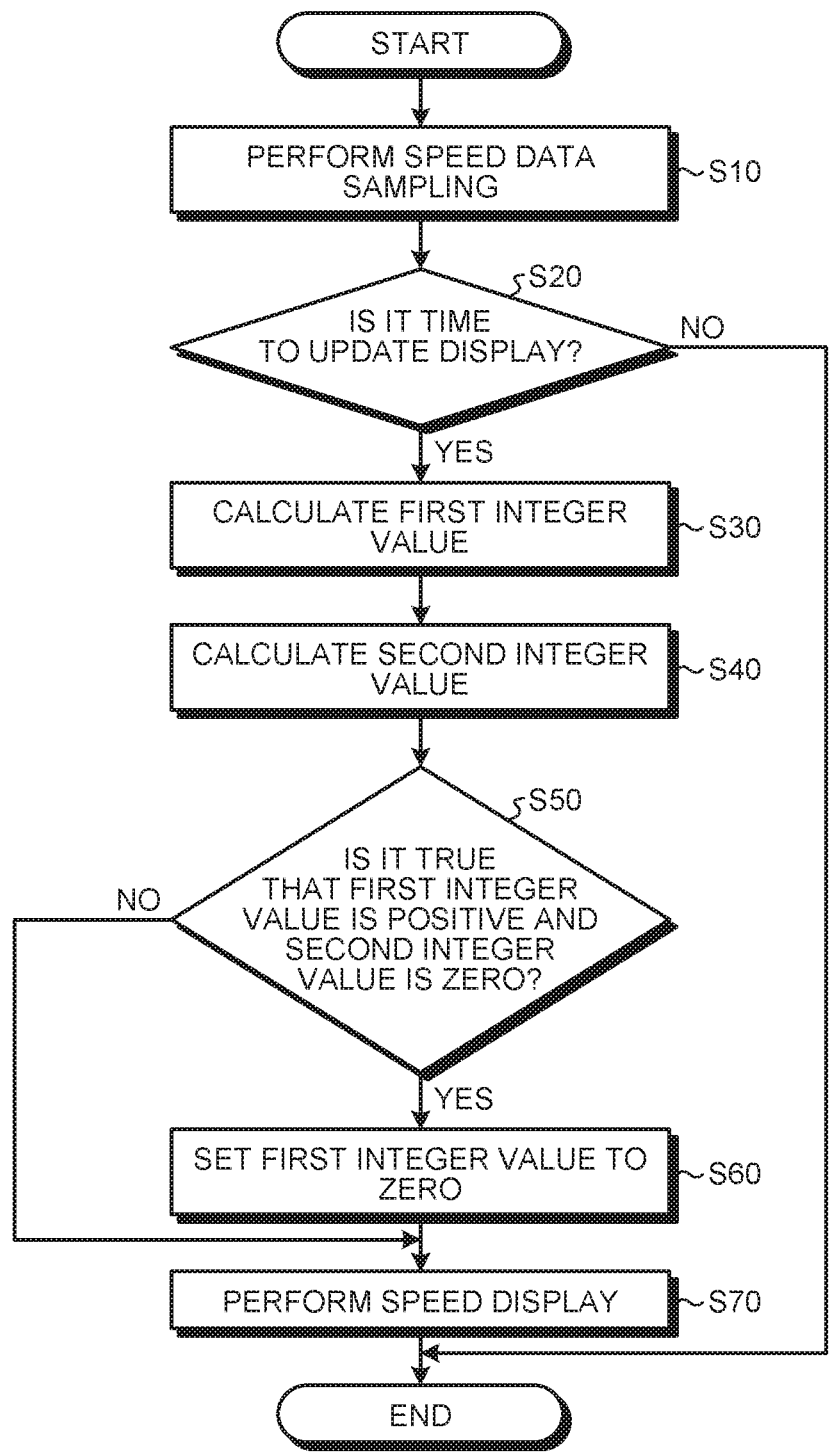
FIG. 5 is a flowchart of operation of the vehicle display device according to the first embodiment.

A first embodiment will be described with reference to FIGS. 1 to 5. The present embodiment relates to a vehicle display device. FIG. 1 is a schematic configuration diagram of the vehicle display device according to the first embodiment. FIG. 2 is a diagram illustrating that the vehicle display device according to the first embodiment displays values of a speed together. FIG. 3 is an explanatory diagram of speed display that is likely to cause discomfort. FIG. 4 is a diagram illustrating exemplary unified speed display according to the first embodiment. FIG. 5 is a flowchart of operation of the vehicle display device according to the first embodiment.

As illustrated in FIG. 1, a vehicle display device 1 according to the first embodiment includes a digital display 3 and a controller 2. The digital display 3 is a digital display unit configured to display a traveling speed in characters. The digital display 3 according to the present embodiment is a liquid crystal display device, and is, for example, a thin film transistor-liquid crystal display (TFT-LCD) capable of color display. The controller 2 is a control device configured to control the digital display 3. The controller 2 includes an arithmetic unit 21, a power circuit 22, interfaces 23, 24, 25, and 26, and an electrically erasable programmable read-only memory (EEPROM) 27. The arithmetic unit 21 includes a central processing unit (CPU) that is a microcomputer, and various ports such as a power port and a communication port. The power circuit 22 connects a power source 5 on a vehicle such as a battery with the arithmetic unit 21 and an LCD drive power source 4. The power circuit 22 transforms direct-current power from the power source 5 and supplies the power to the arithmetic unit 21 and the LCD drive power source 4. The power circuit 22 outputs a reset signal to the arithmetic unit 21.

An ignition signal 6 is a signal indicating the state of an ignition switch of the vehicle, and is switched between "ON" and "OFF" along, for example, on and off of the ignition switch. The ignition signal 6 is input to the arithmetic unit 21 through the interface 23. A vehicle speed detector 7 detects the traveling speed of the vehicle on which the vehicle display device 1 is mounted. The vehicle speed detector 7 according to the present embodiment outputs a pulse signal in accordance with the rotational speed of a wheel by multiplex communication. A vehicle speed signal 8 is a signal indicating a result of the detection by the vehicle speed detector 7, and is input to the arithmetic unit 21 through the interface 24.

A command signal 9 is a signal indicating a command by a user on a main display speed on the digital display 3. The digital display 3 according to the present embodiment displays together two speed values of a first speed obtained by converting the traveling speed of the vehicle into travel kilometers per unit time [km/h] and a second speed obtained by converting the traveling speed into travel miles per unit time [MPH]. The vehicle is provided with a switch 11 configured to switch the main display speed. The switch 11 is provided as an input unit configured to receive a command by the user on which of a first speed value SP1 and a second speed value SP2 is to be a main display target. The user can switch a display mode between a first display mode and a second display mode through an operation on the switch 11. The first display mode is a display mode in which the first speed value is set as a main display target and the second speed value is set as a sub display target. The second display mode is a display mode in which the second speed value is set as a main display target and the first speed value is set as a sub display target. It may be possible to select a third display mode in which the first speed and the second speed are equally displayed. The command signal 9 is a signal indicating a display mode selected through an operation on the switch 11, and is input to the arithmetic unit 21 through the interface 25.

The LCD drive power source 4 transforms direct-current power supplied from the power source 5 through the power circuit 22 into voltage for the digital display 3 and outputs the voltage. The arithmetic unit 21 is connected with the LCD drive power source 4 through the interface 26, and controls the LCD drive power source 4. The arithmetic unit 21 is connected with the digital display 3 through an LCD driver 10. The arithmetic unit 21 controls display operation of the digital display 3 through the LCD driver 10. The arithmetic unit 21 controls, for example, display contents such as characters and figures displayed on the digital display 3, and a display mode. The display mode includes dimensions, positions, colors, and brightness.

The EEPROM 27 is a non-transitory memory device. The EEPROM 27 stores therein, for example, the content of an operation program executed by the arithmetic unit 21 and data on display modes of speed values and figures to be displayed on the digital display 3.

As illustrated in FIG. 2, the digital display 3 displays the two speed values of the first speed value SP1 and the second speed value SP2 together. The digital display 3 can switch a main display target between the first speed value SP1 and the second speed value SP2. The first speed value SP1 is a speed value in the unit of [km/h] obtained by converting the traveling speed detected by the vehicle speed detector 7 into travel kilometers per unit time. The second speed value SP2 is a speed value in the unit of [MPH] obtained by converting the traveling speed detected by the vehicle speed detector 7 into travel miles per unit time. The digital display 3 according to the present embodiment displays an integer value (hereinafter referred to as a "first integer value") of the first speed value SP1, and displays an integer value (hereinafter referred to as a "second integer value") of the second speed value SP2. More specifically, the arithmetic unit 21 converts a wheel rotational speed detected by the vehicle speed detector 7 into travel kilometers per unit time (hereinafter simply referred to as a "first speed unit"). The arithmetic unit 21 performs fraction processing to change this converted value into an integer as the first integer value. The arithmetic unit 21 also converts the wheel rotational speed detected by the vehicle speed detector 7 into travel miles per unit time (hereinafter simply referred to as a "second speed unit"). The arithmetic unit 21 performs the fraction processing to change this converted value into an integer as the second integer value. The fraction processing according to the present embodiment is performed by rounding. The arithmetic unit 21 calculates the first integer value and the second integer value by rounding the first decimal places of the converted values.

The arithmetic unit 21 displays the first integer value obtained by the rounding as the first speed value SP1 on the digital display 3, and displays the second integer value as the second speed value SP2 on the digital display 3. In the first embodiment, the digital display 3 displays the first speed value SP1 at an upper position and the second speed value SP2 at a lower position. The first speed value SP1 is displayed larger than the second speed value SP2. In the digital display 3, among the two speed values SP1 and SP2, the first speed value SP1 is displayed as a main display target, and the second speed value SP2 is displayed as a sub display target. Displaying the two speed values SP1 and SP2 on the digital display 3 achieves an improved convenience for the user. For example, the user who is accustomed to the first speed unit ([km/h]) can drive the vehicle without feeling uncomfortable in countries and regions in which the second speed unit ([MPH]) is generally used.

However, displaying the two speed values SP1 and SP2 together on the digital display 3 causes discomfort to the user in some cases. An example is a case illustrated in FIG. 3, in which 1 [km/h] is displayed as the first speed value SP1, and 0 [MPH] is displayed as the second speed value SP2. For example, when the vehicle is decelerated, a traveling speed converted into the first speed unit becomes 0.75 [km/h], and a traveling speed converted into the second speed unit becomes 0.46875 [MPH]. In this case, the rounding obtains the first integer value of one and the second integer value of zero. As a result, 1 [km/h] indicating a traveling state is displayed as the first speed value SP1, whereas 0 [MPH] indicating a stopped state is displayed as the second speed value SP2. Such a display may potentially cause discomfort to the user.

When the second integer value is zero and the first integer value is positive (integer larger than zero and equal to or more than one; hereinafter, this definition is applied to any positive integer value), the controller 2 according to the first embodiment performs a correction to set the first integer value to zero and displays the first integer value and the second integer value on the digital display 3. Specifically, as illustrated in FIG. 4, the controller 2 displays a corrected integer value of 0 [km/h] as the first speed value SP1 on the digital display 3. In other words, the controller 2 corrects the first integer value, which is calculated to be one by rounding, to zero, which is identical to the second integer value. Accordingly, the first speed value SP1 and the second speed value SP2 are both displayed as zero, which reduces discomfort caused to the user.

The following describes operation of the vehicle display device 1 according to the first embodiment with reference to FIG. 5. A control process illustrated in FIG. 5 is repeatedly executed in a predetermined cycle, and is executed when the ignition signal 6 is "ON", for example. At step S10, the arithmetic unit 21 performs sampling of speed data. The arithmetic unit 21 acquires a pulse signal output from the vehicle speed detector 7. The arithmetic unit 21 counts the number of pulses output in, for example, a predetermined pulse detection duration. The arithmetic unit 21 according to the present embodiment executes the sampling of speed data in a predetermined sampling cycle. After step S10, the process proceeds to step S20.

At step S20, the arithmetic unit 21 determines whether it is time to update display. The arithmetic unit 21 simultaneously updates display contents of the first speed value SP1 and the second speed value SP2 on the digital display 3 in each predetermined display update cycle. If an elapsed time since the previous update of speed display is equal to or longer than the display update cycle, the determination at step S20 is positive. As a result of the determination at step S20, the process proceeds to step S30 if the determination is positive (Yes at step S20), or temporarily ends this control process if the determination is negative (No at step S20).

At step S30, the arithmetic unit 21 calculates the first integer value. The arithmetic unit 21 calculates a traveling speed of the vehicle converted into the first speed unit ([km/h]) based on the speed data sampled at step S10. The arithmetic unit 21 calculates the first integer value by rounding the first decimal place of the calculated traveling speed. After step S30, the process proceeds to step S40.

At step S40, the arithmetic unit 21 calculates the second integer value. The arithmetic unit 21 calculates a traveling speed converted into the second speed unit ([MPH]) based on the traveling speed of the first speed unit calculated at step S30. The traveling speed of the first speed unit referred to in this calculation may be a value before or after the rounding. The arithmetic unit 21 calculates the second integer value by rounding the first decimal place of the calculated traveling speed of the second speed unit. After step S40, the process proceeds to step S50.

At step S50, the arithmetic unit 21 determines whether the first integer value is a positive value and the second integer value is zero. If the first integer value calculated at step S30 is a positive value (for example, one) and the second integer value calculated at step S40 is zero, the determination at step S50 is positive. If the first integer value and the second integer value are both zero or if the first integer value and the second integer value are both positive values, the determination at step S50 is negative. As a result of the determination at step S50, the process proceeds to step S60 if the determination is positive (Yes at step S50), or proceeds to step S70 if the determination is negative (No at step S50).

At step S60, the arithmetic unit 21 sets the first integer value to zero. In other words, the controller 2 according to the present embodiment corrects the first integer value to zero when the second integer value is zero and the first integer value is positive (Yes at step S50). After step S60, the process proceeds to step S70.

At step S70, the arithmetic unit 21 performs speed display. The arithmetic unit 21 displays the first integer value as the first speed value SP1 on the digital display 3 and displays the second integer value as the second speed value SP2 on the digital display 3. If the process proceeds to step S70 after step S60, 0 km/h is displayed as the first speed value SP1, and 0 MPH is displayed as the second speed value SP2. If the process proceeds to step S70 after the negative determination at step S50, the first integer value calculated at step S30 is displayed as the first speed value SP1, and the second integer value calculated at step S40 is displayed as the second speed value SP2. After step S70, this control process ends.

As described above, the vehicle display device 1 according to the first embodiment includes the vehicle speed detector 7, the digital display 3, and the controller 2. The digital display 3 displays together the first integer value obtained by converting the traveling speed into travel kilometers per unit time and the second integer value obtained by converting the traveling speed into travel miles per unit time. When the second integer value is zero and the first integer value is positive (Yes at step S50), the controller 2 performs a correction to set the first integer value to zero (step S60) and displays the corrected first integer value on the digital display 3 (step S70). In other words, the vehicle display device 1 according to the present embodiment performs a correction to unify the two integer values into one of the value for the traveling state and the value for the stopped state. The vehicle display device 1 according to the present embodiment can display together values of the traveling speed in the two different units while achieving reduced discomfort caused to the user.

When the second integer value is zero and the first integer value is positive, the vehicle display device 1 corrects the first integer value to zero. When the vehicle decelerates, the vehicle display device 1 can change the first speed value SP1 from a positive value to zero in synchronization with a timing at which the second speed value SP2 changes to zero. When the vehicle starts moving, the vehicle display device 1 can change the first speed value SP1 from zero to a positive value in synchronization with a timing at which the second speed value SP2 changes from zero to a positive value. This corresponds to changing the first speed value SP1 to a value identical to the second speed value SP2 using the second speed value SP2 converted into the second speed unit ([MPH]) as a reference.

The controller 2 according to the present embodiment causes the digital display 3 to display one of the first integer value and the second integer value in a character size larger than that of the other. This makes one of the first speed value SP1 and the second speed value SP2 more noticeable than the other, as a main display target.

The method of calculating the first speed value SP1 and the second speed value SP2 and the order of their calculations are not limited to the above-described examples. For example, the second speed value SP2 may be calculated first based on a result of the detection by the vehicle speed detector 7, and the first speed value SP1 may be calculated from the second speed value SP2. Alternatively, the first speed value SP1 and the second speed value SP2 may be independently calculated based on a result of the detection by the vehicle speed detector 7. In other words, the first speed value SP1 may be calculated not from the second speed value SP2, and the second speed value SP2 may be calculated not from the first speed value SP1.

The fraction processing to calculate the first integer value and the second integer value is not limited to rounding, and may be rounding down or rounding up. For example, the first integer value and the second integer value may be calculated by rounding down or up the first decimal place. The fraction processing may be performed on the second decimal places or lower.

The digital display 3 is not limited to a liquid crystal display device. The digital display 3 may be a liquid crystal display device that displays the first speed value SP1 and the second speed value SP2 by displaying segments, or a device that displays the first speed value SP1 and the second speed value SP2 by displaying dots. The digital display 3 may be a display device including a vacuum fluorescent display (VFD) or a light emitting diode (LED). The digital display 3 may be a head-up display (HUD) device. In the HUD device, light projected by a projection device (for example, a liquid crystal display device) is reflected toward the inside of the vehicle by a windshield or a reflective member (combiner). This reflected light displays virtual images of the speed values SP1 and SP2 in front of a driver. In this manner, the windshield and the reflective member serve as the digital display 3 that displays the speed values SP1 and SP2 toward a person in the vehicle. The controller 2 controls, through a command to the projection device, contents of display of the speed values SP1 and SP2 by the windshield and the reflective member and the display mode of the display. The digital display 3 may be an integration of a plurality of display devices. For example, separate display devices that display the first speed value SP1 and the second speed value SP2, respectively, may be provided.

First Modification of First Embodiment

Figure 6:
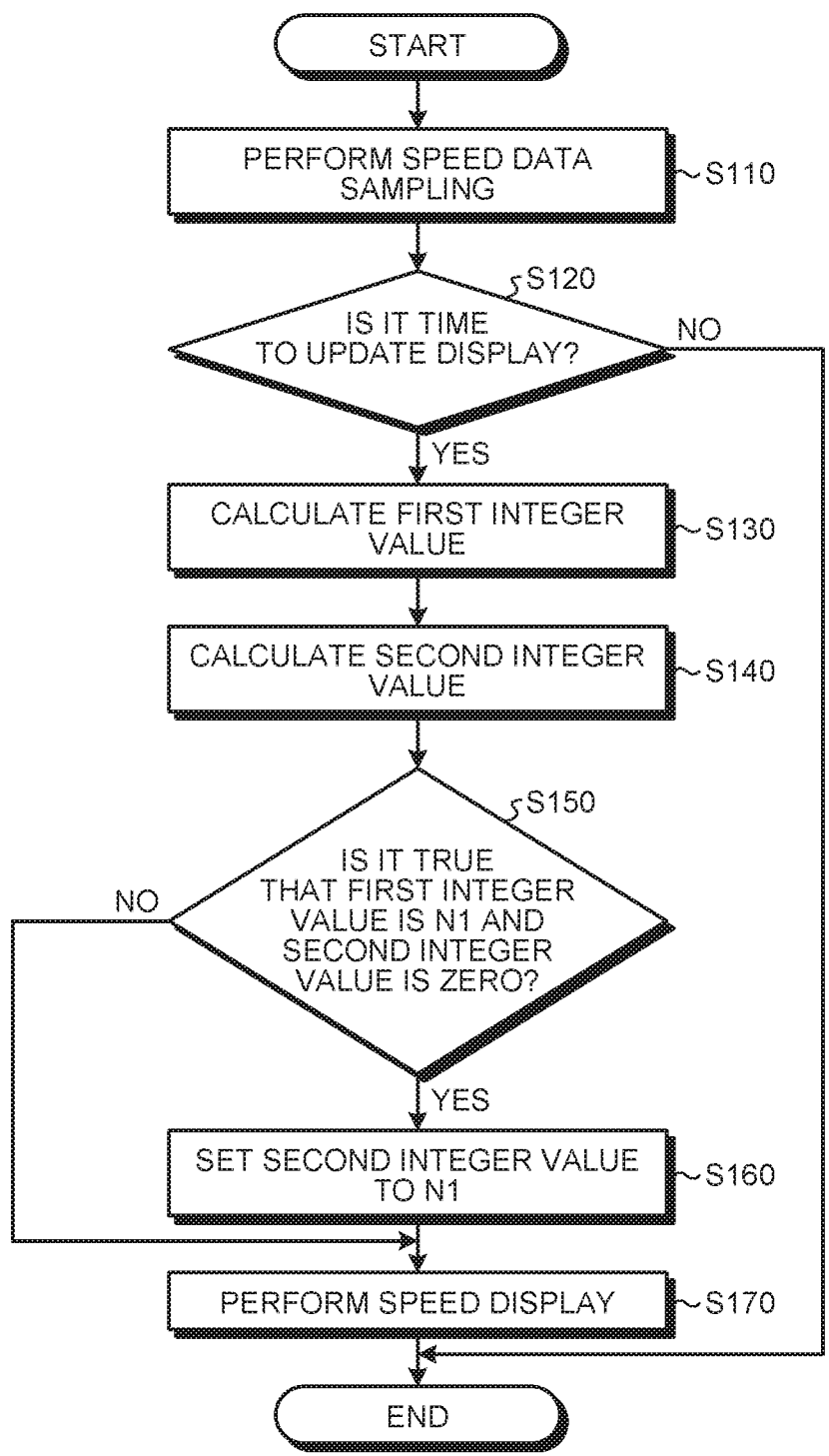
FIG. 6 is a flowchart of operation of a vehicle display device according to a first modification of the first embodiment.
Figure 7:
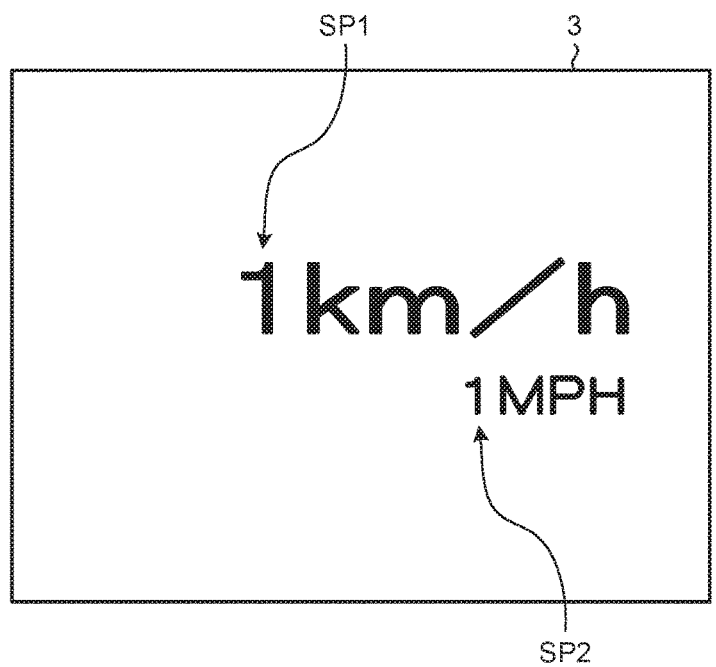
FIG. 7 is a diagram illustrating exemplary unified speed display according to the first modification of the first embodiment.

A first modification of the first embodiment will be described with reference to FIGS. 6 and 7. FIG. 6 is a flowchart of operation of a vehicle display device according to the first modification of the first embodiment. FIG. 7 is a diagram illustrating exemplary unified speed display according to the first modification of the first embodiment. The first modification of the first embodiment differs from the first embodiment in that the second integer value is corrected to a positive value when the second integer value is zero and the first integer value is positive. As an example of this correction, in the flowchart illustrated in FIG. 6, the second integer value is corrected to a value identical to the first integer value. This corresponds to changing the second speed value SP2 to a value identical to the first speed value SP1 converted into the first speed unit ([km/h]) using the first speed value SP1 as a reference.

The operation of the vehicle display device 1 according to the first modification of the first embodiment will be described with reference to FIG. 6. A control process illustrated in FIG. 6 is repeatedly executed in a predetermined cycle, and is executed when, for example, the ignition signal 6 is "ON". Processing at steps S110 to S140 is the same as the processing at steps S10 to S40 in the first embodiment (FIG. 5). In other words, the arithmetic unit 21 samples speed data (step S110), and when it is time to update display (Yes at step S120), the arithmetic unit 21 calculates the first integer value (step S130) and the second integer value (step S140). Then, the process proceeds to step S150.

At step S150, the arithmetic unit 21 determines whether the first integer value is a positive integer value N1 and the second integer value is zero. The positive integer value N1 is an integer value larger than zero, such as 1, 2, 3, . . . The determination at step S150 is negative when the first integer value and the second integer value are both positive values or when the first integer value and the second integer value are both zero. As a result of the determination at step S150, the process proceeds to step S160 if the determination is positive (Yes at step S150), or proceeds to step S170 if the determination is negative (No at step S150).

At step S160, the arithmetic unit 21 sets the second integer value to the positive integer value N1. Specifically, the controller 2 according to the present modification corrects the second integer value to a value identical to the first integer value when the second integer value is zero and the first integer value is positive (Yes at step S150). After step S160, the process proceeds to step S170.

At step S170, the arithmetic unit 21 performs speed display. The arithmetic unit 21 displays the first integer value as the first speed value SP1 on the digital display 3, and displays the second integer value as the second speed value SP2 on the digital display 3. If the process proceeds to step S170 after step S160, as illustrated in FIG. 7, 1 km/h is displayed as the first speed value SP1, and a corrected value of 1 MPH is displayed as the second speed value SP2. If the process proceeds to step S170 after the negative determination at step S150, the first integer value calculated at step S130 is displayed as the first speed value SP1, and the second integer value calculated at step S140 is displayed as the second speed value SP2. After step S170, this control process ends.

As described above, the vehicle display device 1 according to the present modification corrects the second integer value to a value identical to the first integer value when the second integer value is zero and the first integer value is positive. In this manner, the vehicle display device 1 according to the present modification can change the second speed value SP2 to zero in synchronization with a timing at which the first speed value SP1 changes to zero when the vehicle decelerates. This corresponds to delaying a timing at which display of the second speed value SP2 changes to zero in the digital display 3. In addition, the vehicle display device 1 according to the present modification can change the second speed value SP2 from zero to a positive value in synchronization with a timing at which the first speed value SP1 changes from zero to a positive value when the vehicle starts moving. This corresponds to advancing a timing at which display of the second speed value SP2 changes from zero to a positive value in the digital display 3.

The controller 2 may correct the second integer value to a positive integer value different from the first integer value when the second integer value is zero and the first integer value is positive. Such a correction is performed, for example, when positive integers displayed as the first integer value and the second integer value have a minimum value other than one, or when a method of the fraction processing on the first integer value is different from a method of the fraction processing on the second integer value. The controller 2 may correct the second integer value to a value different from the first integer value under a condition different from the above-described condition. Thus, the controller 2 according to the first modification performs a correction to set the second integer value to a positive value when the second integer value is zero and the first integer value is positive, and the corrected second integer value may be a value identical to the first integer value or a value not identical thereto.

Second Modification of First Embodiment

A second modification of the first embodiment will be described. The controller 2 may perform different corrections of the speed values SP1 and SP2 depending on the traveling state of the vehicle. The controller 2 according to the second modification switches methods of correcting the speed values SP1 and SP2 depending on whether the vehicle is accelerating or decelerating, when the second integer value is zero and the first integer value is positive. The controller 2 corrects the first integer value to zero when the second integer value is zero, the first integer value is positive, and the traveling speed is decreasing. In contrast, the controller 2 corrects the second integer value to a positive value when the second integer value is zero, the first integer value is positive, and the traveling speed is increasing.

Specifically, when the vehicle decelerates, the vehicle display device 1 according to the second modification corrects the first integer value and simultaneously changes the first speed value SP1 and the second speed value SP2 from positive values to zero. In contrast, when the vehicle accelerates, the vehicle display device 1 corrects the second integer value and simultaneously changes the first speed value SP1 and the second speed value SP2 from zero to a positive value. When the vehicle decelerates, the vehicle display device 1 according to the second modification corrects the first integer value to the second integer value that changes to zero first. In contrast, when the vehicle accelerates, the vehicle display device 1 according to the second modification corrects the second integer value to the first integer value that changes to a positive value first.

Third Modification of First Embodiment

A third modification of the first embodiment will be described. The controller 2 may perform a correction to set a speed value as a sub display target to a speed value displayed as a main display target. For example, in FIG. 4, the first speed value SP1 is displayed as a main display target, and the second speed value SP2 is displayed as a sub display target. The first speed value SP1 as the main display target is displayed in a character size larger than that of the second speed value SP2 as the sub display target. In this case, the controller 2 corrects an integer value (the second integer value) out of the first integer value and the second integer value, which is displayed in a smaller character size, to a value identical to an integer value (the first integer value) displayed in a larger character size. More specifically, the controller 2 changes the second speed value SP2 to zero simultaneously when the first speed value SP1 changes from a positive value to zero. In other words, the controller 2 displays a positive value, for example, one as the second speed value SP2 while the first integer value is positive even when the second integer value is calculated to be zero. The controller 2 changes the second integer value to zero when the first integer value changes zero, and displays zero as the second speed value SP2.

The controller 2 changes the second speed value SP2 from zero to a value identical to the first speed value SP1 when the first speed value SP1 changes from zero to a positive value. In other words, when the first integer value changes to a positive value, the controller 2 corrects the second integer value to the same positive value even when the second integer value is still zero. As described above, the controller 2 changes, depending on one of the speed values selected as a main display target by the user, the other speed value from a positive value to zero or from zero to a positive value. Accordingly, the vehicle display device 1 according to the third modification can appropriately reduce discomfort caused to the user.

Second Embodiment

Figure 8:
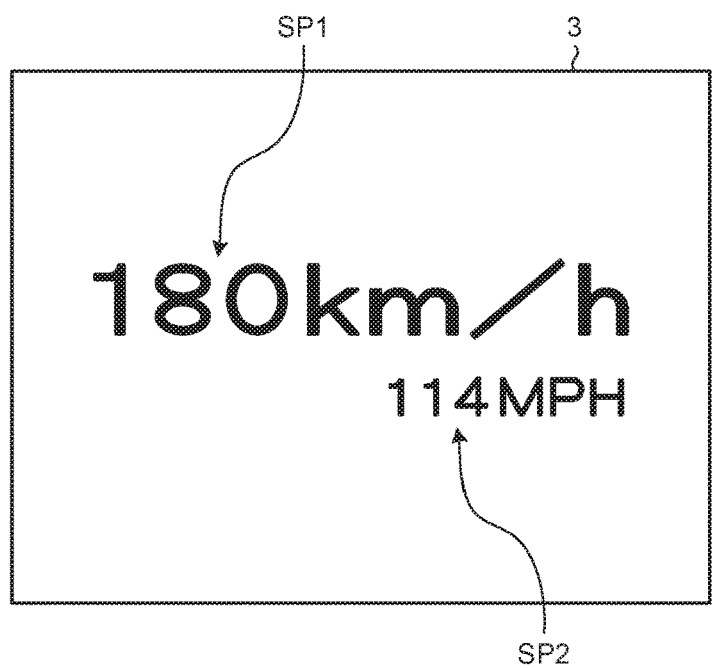
FIG. 8 is an explanatory diagram of speed display that is likely to cause discomfort.
Figure 9:
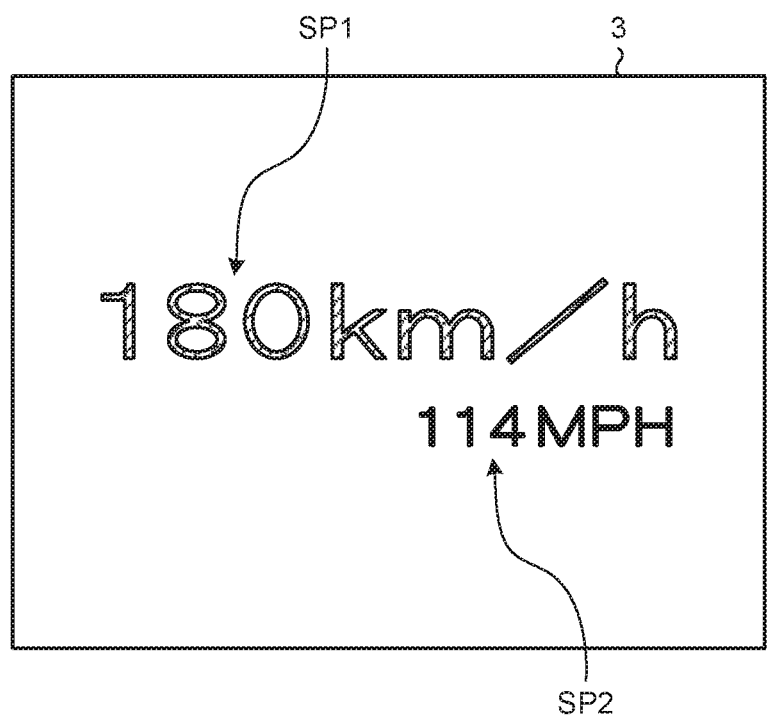
FIG. 9 is a diagram illustrating exemplary speed display according to a second embodiment.
Figure 10:
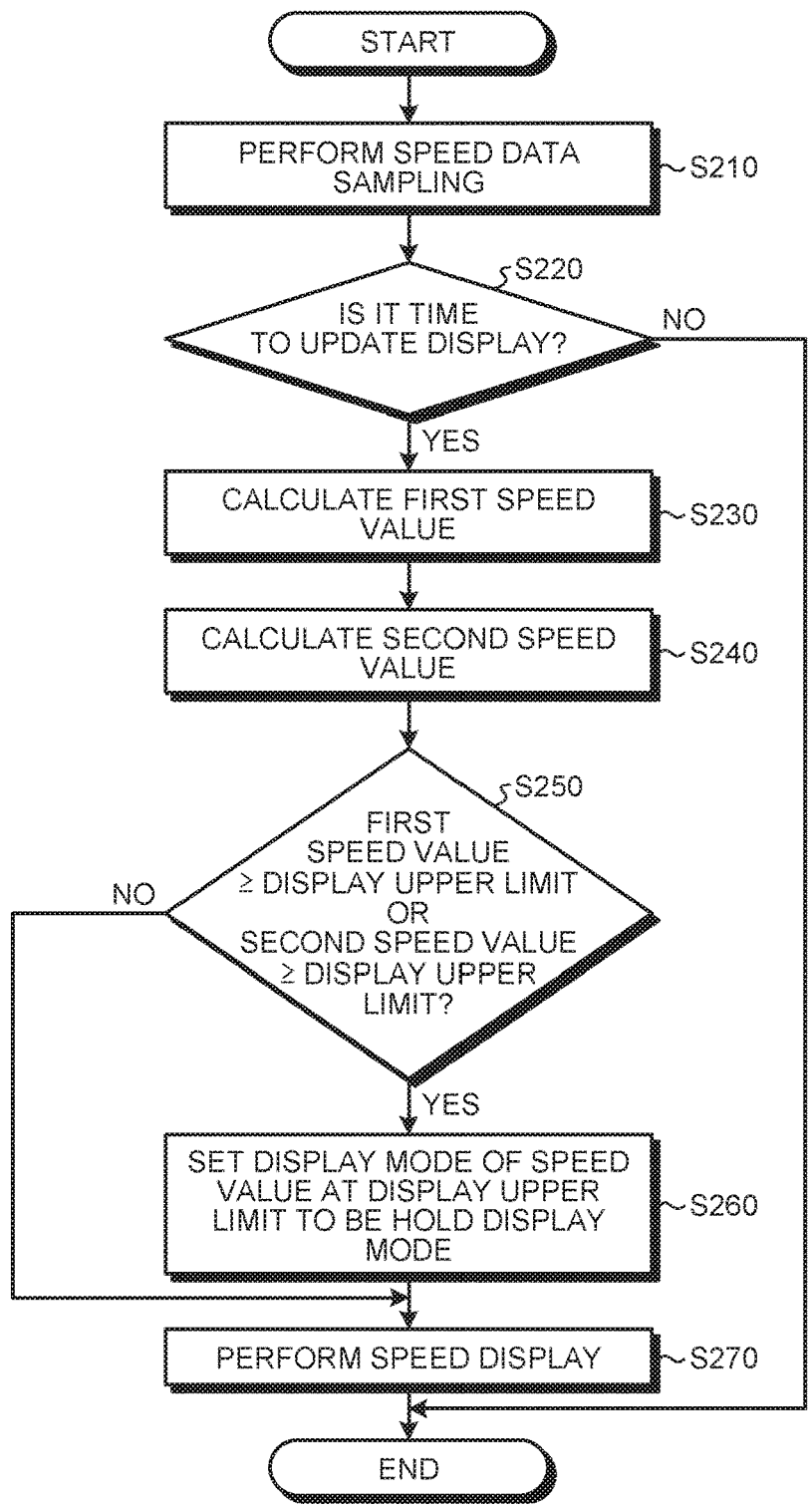
FIG. 10 is a flowchart of operation of a vehicle display device according to the second embodiment.

A second embodiment will be described with reference to FIGS. 8 to 11. Any component in the second embodiment having the same function as that of a component described in the first embodiment is denoted by an identical reference numeral, and any duplicate description thereof will be omitted. FIG. 8 is an explanatory diagram of speed display likely to cause discomfort. FIG. 9 is a diagram illustrating exemplary speed display according to the second embodiment. FIG. 10 is a flowchart of operation of a vehicle display device according to the second embodiment. The vehicle display device 1 according to the second embodiment displays the first speed value SP1 in the display mode of hold display when the first speed value SP1 has reached a display upper limit. This reduces discomfort caused to the user as described below.

FIG. 8 illustrates a state in which the first speed value SP1 has reached the display upper limit and the second speed value SP2 has not reached the display upper limit. Similarly to the first embodiment, the controller 2 according to the second embodiment displays one of the speed values SP1 and SP2 on the digital display 3 in a character size larger than that of the other. The first speed value SP1 and the second speed value SP2 displayed on the digital display 3 have defined display upper limits SP1$x$ and SP2$x$, respectively. In the present embodiment, the display upper limit SP1$x$ of the first speed value SP1 is 180 km/h, and the display upper limit SP2$x$ of the second speed value SP2 is 120 MPH.

The display upper limit SP1$x$ of the first speed value SP1 is the maximum integer value of a speed range of the first speed value SP1 displayed on the digital display 3. Specifically, an integer value in a range of 0 to SP1$x$ is displayed as the first speed value SP1 on the digital display 3. When the first integer value is equal to or larger than the display upper limit SP1$x$, the display upper limit SP1$x$ is displayed as the first speed value SP1. The display upper limit SP2$x$ of the second speed value SP2 is the maximum integer value of a speed range of the second speed value SP2 displayed on the digital display 3. Specifically, an integer value in a range of 0 to SP2$x$ is displayed as the second speed value SP2 on the digital display 3. When the second integer value is equal to or larger than the display upper limit SP2$x$, the display upper limit SP2$x$ is displayed as the second speed value SP2.

When the traveling speed of the vehicle is 180 km/h, the first speed value SP1 has reached the display upper limit SP1$x$, but the second speed value SP2 is 112 MPH, which is smaller than the display upper limit SP2$x$ (=120 MPH). Thus, as the traveling speed of the vehicle increases from this state, the second speed value SP2 changes from 113 MPH to 120 MPH while the first speed value SP1 is fixed to the display upper limit SP1$x$. The change of the second speed value SP2 while the first speed value SP1 is fixed potentially causes discomfort to the user.

The vehicle display device 1 according to the second embodiment performs hold display of the first speed value SP1 as illustrated in FIG. 9 when the first speed value SP1 is equal to or larger than the display upper limit SP1$x$. The hold display is a display mode that allows the user to visually recognize that the first speed value SP1 is equal to or larger than the display upper limit SP1$x$ and the displayed value is fixed. The display mode of the first speed value SP1 in the hold display is different from the display mode (hereinafter referred to as the "display mode of the normal display") of the first speed value SP1 when the first speed value SP1 is smaller than the display upper limit SP1$x$.

In the vehicle display device 1 according to the present embodiment, the text color of the display mode of the hold display is different from the text color of the display mode of the normal display. The text color of the display mode of the normal display is, for example, white or black. The vehicle display device 1 displays the first speed value SP1 in the text color of the normal display when the first speed value SP1 is smaller than the display upper limit SP1$x$. Similarly, the vehicle display device 1 displays the second speed value SP2 in the text color of the normal display when the second speed value SP2 is smaller than the display upper limit SP2$x$. The text color of the normal display is the same for the first speed value SP1 and the second speed value SP2. The text color of the display mode of the hold display is, for example, red. The text color of the hold display is preferably a color that draws stronger attention than the text color of the normal display. Displaying the first speed value SP1 in such a color allows the user to recognize that the traveling speed is high.

The operation of the vehicle display device 1 according to the second embodiment will be described with reference to FIG. 10. A control process illustrated in FIG. 10 is repeatedly executed in a predetermined cycle, and is executed when, for example, the ignition signal 6 is "ON". Processing at steps S210 to S220 is the same as the processing at steps S10 to S20 in the first embodiment (FIG. 5). In other words, the arithmetic unit 21 samples speed data (step S210), and determines whether it is time to update display (step S220). The process proceeds to step S230 if the determination is positive at step S220, or temporarily ends this control process if the determination is negative (No at step S220).

At step S230, the arithmetic unit 21 calculates the first speed value SP1. Similarly to step S30 in the first embodiment, for example, the arithmetic unit 21 calculates the rounded first integer value as the first speed value SP1. After step S230, the process proceeds to step S240.

At step S240, the arithmetic unit 21 calculates the second speed value SP2. Similarly to step S40 in the first embodiment, for example, the arithmetic unit 21 calculates the rounded second integer value as the second speed value SP2. After step S240, the process proceeds to step S250.

At step S250, the arithmetic unit 21 determines whether a condition that the first speed value SP1 is equal to or larger than the display upper limit SP1$x$ or a condition that the second speed value SP2 is equal to or larger than the display upper limit SP2$x$ is satisfied. The determination at step S250 is positive if at least one of these two conditions is satisfied, or is negative if none of the two conditions are satisfied. As a result of the determination at step S250, the process proceeds to step S260 if the determination is positive (Yes at step S250), or proceeds to step S270 if the determination is negative (No at step S250).

At step S260, the arithmetic unit 21 sets the display mode of a speed value at the display upper limit to a hold display mode. The following description of operations at step S260 and step S270 is applicable to a case in which the first speed value SP1 is equal to or larger than the display upper limit SP1$x$ and the second speed value SP2 is smaller than the display upper limit SP2$x$. The arithmetic unit 21 sets the text color of the first speed value SP1 to the text color of the hold display because the first speed value SP1 is equal to or larger than the display upper limit SP1$x$. The text color of the second speed value SP2 is set to the text color of the normal display. After step S260, the process proceeds to step S270.

At step S270, the arithmetic unit 21 performs speed display. The arithmetic unit 21 displays the first speed value SP1 and the second speed value SP2 on the digital display 3. The first speed value SP1 is displayed on the digital display 3 in the text color of the hold display. The second speed value SP2 is displayed on the digital display 3 in the text color of the normal display. If the process proceeds to step S270 after the negative determination at step S250, the first speed value SP1 and the second speed value SP2 are both displayed on the digital display 3 in the text color of the normal display. After step S270, this control process ends.

As described above, when the first speed value SP1 or the second speed value SP2 are equal to or larger than the display upper limits SP1x and SP2x, respectively, as the maximum values of a speed range displayed on the digital display 3, the controller 2 according to the second embodiment displays these speed values on the digital display 3 in display modes different from those when these speed values are smaller than the display upper limits SP1xand SP2x. Accordingly, the user is unlikely to feel discomfort caused when the speed values SP1 and SP2 having reached the display upper limits SP1x and SP2x do not change. In this manner, the vehicle display device 1 according to the second embodiment can reduce discomfort caused to the user when the two speed values SP1 and SP2 are displayed together.

The numerical values displayed as the first speed value SP1 and the second speed value SP2 on the digital display 3 are not limited to integers.

First Modification of Second Embodiment

Figure 11:
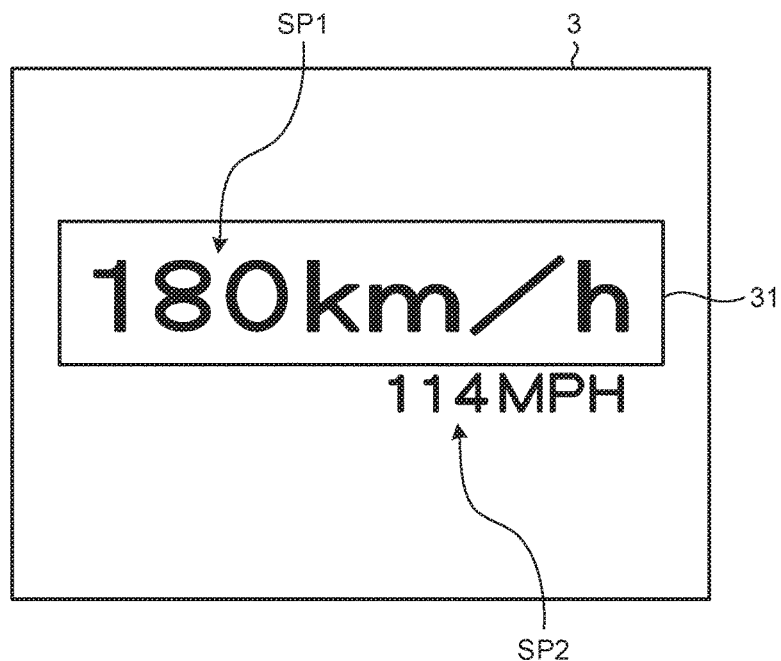
FIG. 11 is a diagram illustrating speed display according to a first modification of the second embodiment.

A first modification of the second embodiment will be described with reference to FIG. 11. The display mode of the speed values SP1 and SP2 equal to or larger than the display upper limits SP1x and SP2x is not limited to the mode described as an example in the second embodiment. For example, the controller 2 may display a frame-shaped display 31 added to any of the speed values SP1 and SP2 equal to or larger than the display upper limits SP1x and SP2x. In FIG. 11, the frame-shaped display 31 is added to the first speed value SP1 being equal to or larger than the display upper limit SP1x. In this manner, the first speed value SP1 is displayed in this framed mode, which makes it easy for the user to recognize that the first speed value SP1 is equal to or larger than the display upper limit SP1x. The controller 2 may display the speed values SP1 and SP2 in different fonts between the hold display and the normal display.

Second Modification of Second Embodiment

A second modification of the second embodiment will be described. The controller 2 may display the first speed value SP1 and the second speed value SP2 both in the display mode of the hold display on the digital display 3 when the first speed value SP1 and the second speed value SP2 are both equal to or larger than the display upper limits SP1x and SP2x. This reduces discomfort caused to the user when the first speed value SP1 and the second speed value SP2 do not change.

Third Embodiment

Figure 12:
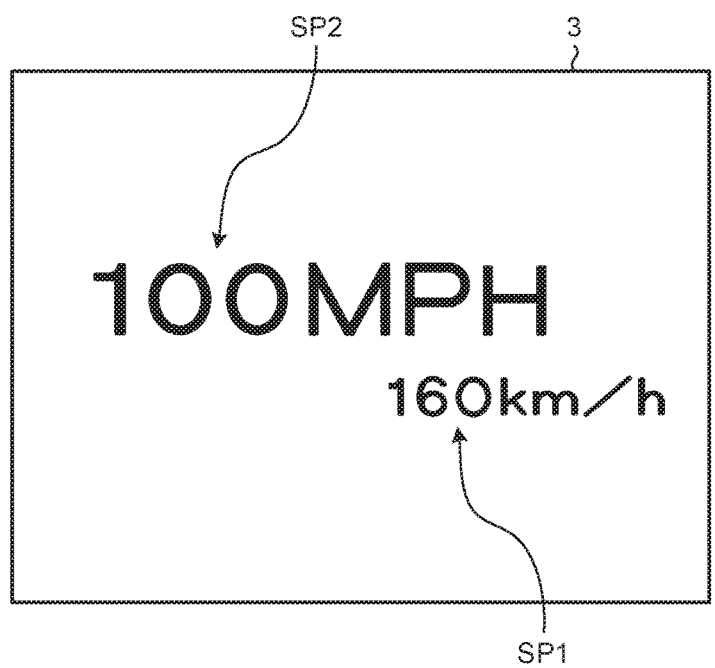
FIG. 12 is an explanatory diagram of speed display that is likely to cause discomfort.
Figure 13:
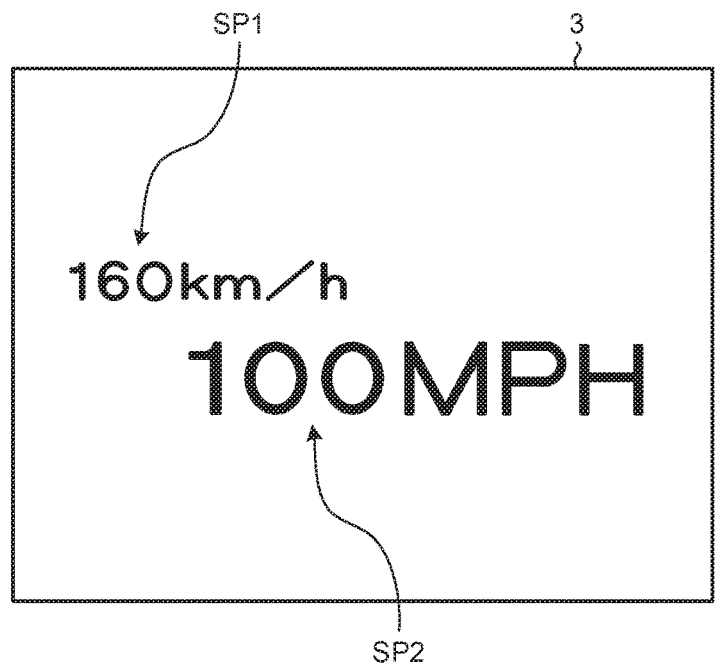
FIG. 13 is a diagram illustrating exemplary speed display according to a third embodiment.

A third embodiment will be described with reference to FIGS. 12 and 13. Any component in the third embodiment having the same function as that described in the first embodiment and the second embodiment is denoted by an identical reference numeral, and any duplicate description thereof will be omitted. FIG. 12 is an explanatory diagram of speed display likely to cause discomfort. FIG. 13 is a diagram illustrating exemplary speed display according to the third embodiment. The vehicle display device 1 according to the third embodiment sets one of the first speed value SP1 and the second speed value SP2 as a main display target and the other as a sub display target in accordance with a command by the user. The vehicle display device 1 sets the visibility of the speed value as the main display target to be higher than the visibility of the speed value as the sub display target.

Similarly to the first embodiment, the vehicle display device 1 according to the third embodiment sets different character sizes to achieve different visibilities of the two speed values SP1 and SP2. In FIG. 2, the first speed value SP1 is displayed as a main display target, and the second speed value SP2 is displayed as a sub display target. The first speed value SP1 displayed as a main display target has a character size larger than that of the second speed value SP2 displayed as a sub display target. The height and width of characters displayed as a main display target are substantially twice as large as those of characters displayed as a sub display target, for example.

The vehicle display device 1 according to the present embodiment switches a main display target between the first speed value SP1 and the second speed value SP2 in accordance with the command signal 9. The vehicle display device 1 inverts size relation between the character sizes of the first speed value SP1 and the second speed value SP2 when a command to set the second speed value SP2 as a main display target is input while the first speed value SP1 is set as a main display target as illustrated in FIG. 2.

In addition to the inversion of the character size relation, the relative positions of the first speed value SP1 and the second speed value SP2 may be switched as illustrated in FIG. 12. In other words, in a display mode of the main display target, the speed value as the main display target may be displayed in a character size larger than that of the speed value as the sub display target and at a position above the speed value as the sub display target. However, it is expected that the user typically recognizes the kinds of the two speed values depending on the display positions of their characters. Thus, the switching of the relative positions of the two speed values SP1 and SP2 potentially causes discomfort to the user.

As described with reference to FIG. 13, the vehicle display device 1 according to the third embodiment switches a main display target of the digital display 3 between the first speed value SP1 and the second speed value SP2 in accordance with a command by the user while maintaining a relative positional relation between the display position of the first speed value SP1 and the display position of the second speed value SP2. This reduces discomfort caused to the user when the main display target is switched from one of the first speed value SP1 and the second speed value SP2 to the other.

FIG. 13 illustrates a state in which the second speed value SP2 is displayed as a main display target and the first speed value SP1 is displayed as a sub display target. When the user provides a command to set the second speed value SP2 as a main display target while the first speed value SP1 is displayed as a main display target as illustrated in FIG. 2, the arithmetic unit 21 displays the second speed value SP2 as a main display target on the digital display 3. The arithmetic unit 21 changes at least one of the character sizes of the first speed value SP1 and the second speed value SP2 so that the character size of the second speed value SP2 is larger than that of the first speed value SP1. The arithmetic unit 21 according to the present embodiment switches a speed value as a main display target by exchanging the character size of the first speed value SP1 and the character size of the second speed value SP2. In this manner, as illustrated in FIG. 13, the second speed value SP2 is displayed as a main display target in a character size larger than that of the first speed value SP1.

In the vehicle display device 1 according to the third embodiment, as understood from FIGS. 2 and 13, the relative positional relation between the display position of the first speed value SP1 and the display position of the second speed value SP2 is maintained before and after a speed value as a main display target is switched. The first speed value SP1 is displayed relatively higher than (on an upper side of a screen) the second speed value SP2 before and after the switching of the main display target. The first speed value SP1 is displayed left to the second speed value SP2 before and after the switching of the main display target. Thus, a relative positional relation between the display position of the first speed value SP1 and the display position of the second speed value SP2 is maintained in the vertical direction and horizontal direction of the screen. Maintaining of the relative positional relation of the two speed values SP1 and SP2 before and after the switching of the main display target allows the user to read a desired speed value without feeling uncomfortable.

As described above, the controller 2 according to the third embodiment switches a main display target on the digital display 3 between the first speed value SP1 and the second speed value SP2 in accordance with a command by the user while maintaining the relative positional relation between the display position of the first speed value SP1 and the display position of the second speed value SP2. Maintaining the relative positional relation between the display positions of the speed values SP1 and SP2 reduces discomfort caused to the user when a main display target is switched.

The values displayed as the first speed value SP1 and the second speed value SP2 on the digital display 3 are not limited to integers.

Modification of Third Embodiment

Figure 14:
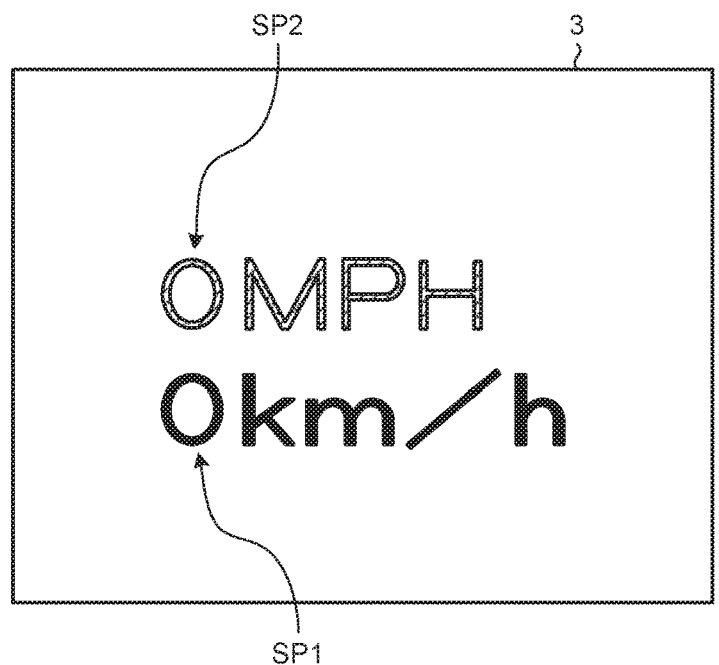
FIG. 14 is a diagram illustrating a display mode with different text colors in a modification of the third embodiment.
Figure 15:
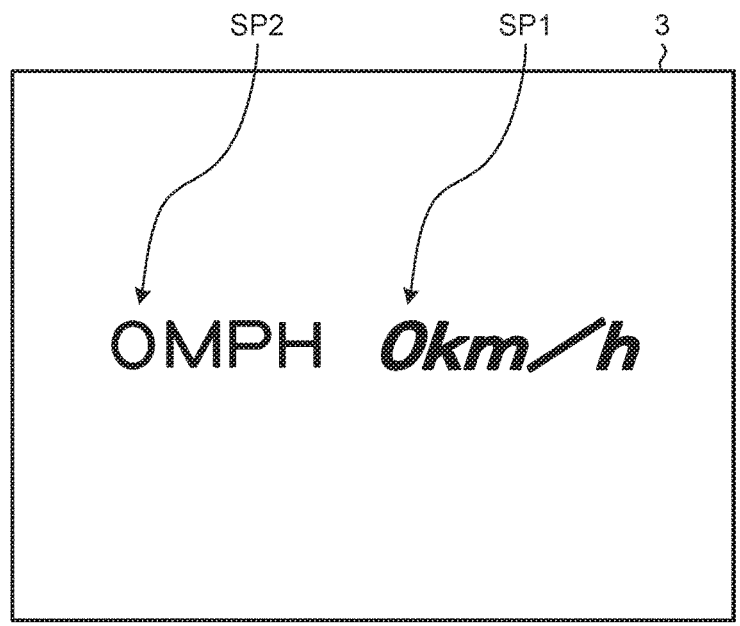
FIG. 15 is a diagram illustrating a display mode with different fonts in the modification of the third embodiment.
Figure 16:
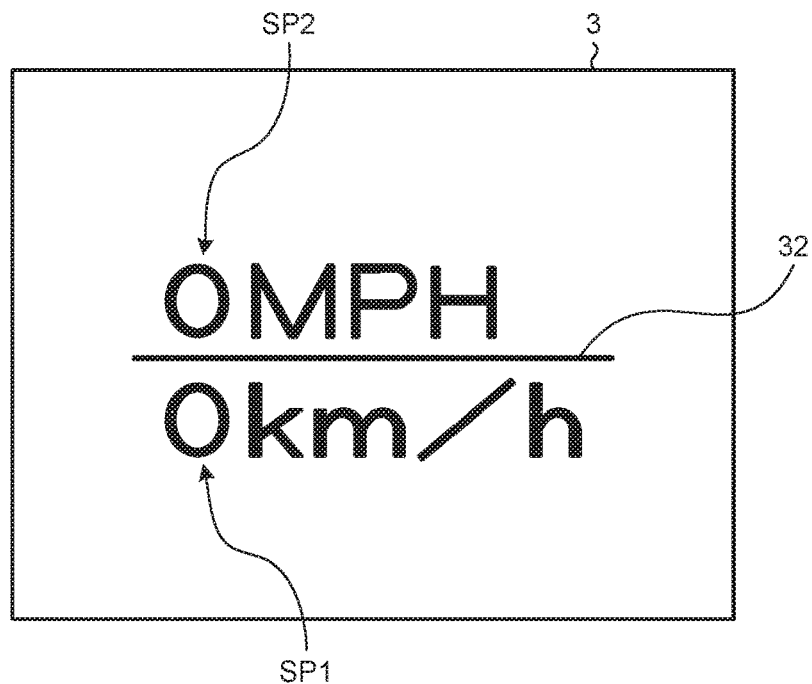
FIG. 16 is a diagram illustrating a display mode with an additional partition line in the modification of the third embodiment.
Figure 17:
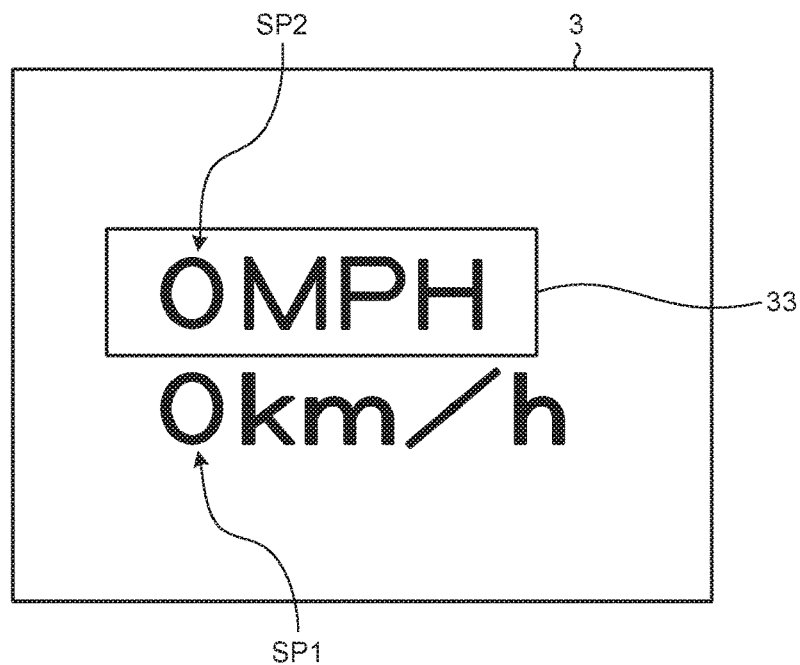
FIG. 17 is a diagram illustrating a display mode with an additional frame-shaped display in the modification of the third embodiment.
Figure 18:
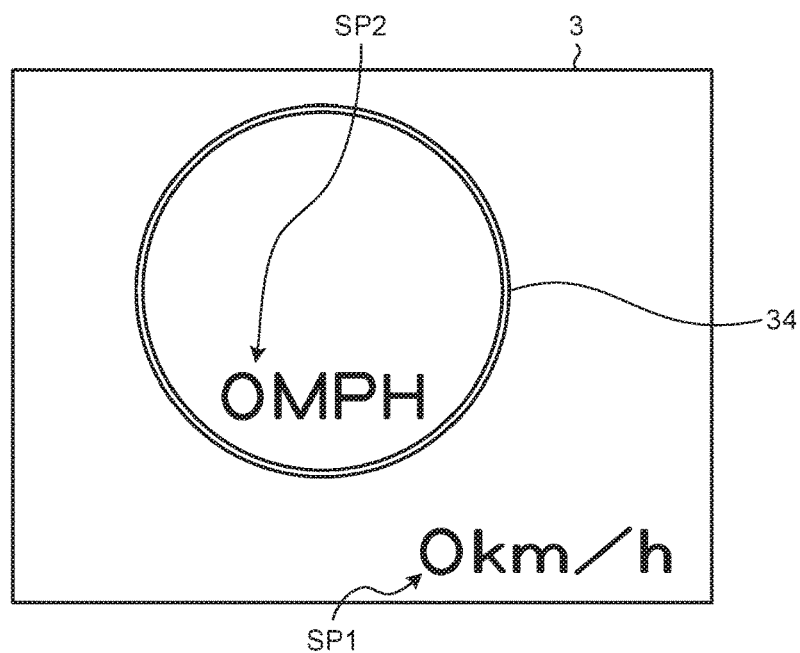
FIG. 18 is a diagram illustrating a display mode of displaying speed values separately inside and outside a frame in the modification of the third embodiment.

A modification of the third embodiment will be described with reference to FIGS. 14 to 18. FIG. 14 is a diagram illustrating a display mode with different text colors in the modification of the third embodiment. FIG. 15 is a diagram illustrating a display mode with different fonts in the modification of the third embodiment. FIG. 16 is a diagram illustrating a display mode with an additional partition line in the modification of the third embodiment. FIG. 17 is a diagram illustrating a display mode with an additional frame-shaped display in the modification of the third embodiment. FIG. 18 is a diagram illustrating a display mode of displaying speed values separately inside and outside a frame in the modification of the third embodiment. A difference in the display mode between a main display target and a sub display target is not limited to the difference in the character size described as an example in the third embodiment. For example, as illustrated in FIG. 14, the controller 2 may have different text colors between the main display target and the sub display target. In this case, the text color of the main display target is preferably a color that draws stronger attention than the text color of the sub display target. For example, when the text color of the sub display target is white, black, blue, or green, for example, the text color of the main display target may be red. The controller 2 may have different background colors between the main display target and the sub display target in place of having different text colors. Alternatively, the speed value as the main display target may be displayed in a luminance higher than that of the speed value as the sub display target.

As illustrated in FIG. 15, the controller 2 may have different fonts between the main display target and the sub display target. In FIG. 15, the first speed value SP1 is displayed as the main display target in an Italic and bold font, and the second speed value SP2 is displayed as the sub display target in a normal font. In this manner, the first speed value SP1 is displayed more noticeable than the second speed value SP2.

As illustrated in FIG. 16, the controller 2 may display, for example, a partition line 32 between a speed value displayed as a main display target and a speed value displayed as a sub display target. The second speed value SP2 displayed above the partition line 32 is the main display target, and the first speed value SP1 displayed below the partition line 32 is the sub display target. The partition line 32 can be described as an underline for highlighting the second speed value SP2.

As illustrated in FIG. 17, the controller 2 may highlight a speed value displayed as a main display target with a frame-shaped display 33. The frame-shaped display 33 is a figure surrounding the second speed value SP2 displayed as the main display target and displayed on the digital display 3. The shape of the frame-shaped display 33 is a rectangle as illustrated in FIG. 17, but may be, for example, an ellipse shape in place of the rectangle.

As illustrated in FIG. 18, the controller 2 may display a speed value as a main display target inside a frame 34 and display a speed value as a sub display target outside the frame 34. The frame 34 is a physical frame member provided to the front surface of the digital display 3. Although not illustrated, the digital display 3 displays images of an analog pointer and indices arranged on an arc and pointed by the pointer. The frame 34 surrounds these indices. The controller 2 displays the second speed value SP2 in a region enclosed by the frame 34 in the digital display 3, and displays the first speed value SP1 in a region outside the frame 34. This highlights the second speed value SP2 as the main display target. The second speed value SP2 is displayed at a position not overlapping the pointer and the indices in a region inside the frame 34, for example, at a bottom part of the region inside the frame 34. The second speed value SP2 is displayed in a character size larger than those of characters of the indices, for example.

When the first speed value SP1 is the main display target, the first speed value SP1 is displayed inside the frame 34, and the second speed value SP2 is displayed outside the frame 34. In this case, the main display target is switched while the relative positional relation between the display position of the first speed value SP1 and the display position of the second speed value SP2 is maintained. Specifically, the second speed value SP2 as the sub display target is displayed higher than the first speed value SP1 as the main display target, for example, above the frame 34.

When the frame 34 is movable, the controller 2 may move the frame 34 in accordance with the switching of the main display target between the speed values SP1 and SP2. For example, when an actuator is provided to move the frame 34 relative to the digital display 3, the controller 2 moves the frame 34 to a position to surround one of the speed values SP1 and SP2 as the main display target. This allows the switching of the main display target without changing the display positions of the first speed value SP1 and the second speed value SP2. The shape of the frame 34 is a circle as illustrated in FIG. 18, but may be, for example, a rectangle in place of the circle.

Modifications of Embodiments

The display mode of the speed values SP1 and SP2 is not limited to the above-described examples. For example, the first to the third embodiments describe the display mode in which the first speed value SP1 and the second speed value SP2 are simultaneously displayed together on the digital display 3. However, a display mode in which one of the speed values SP1 and SP2 is displayed and the other is not displayed may be selected. For example, in the first and the second embodiments, only one speed value (for example, the second speed value SP2) may be displayed in one of selectable display modes, whereas the two speed values SP1 and SP2 may be simultaneously displayed together in the other display modes. In the other display mode, the second speed value SP2 may be displayed as a sub display target, and the first speed value SP1 may be displayed as a main display target. In other words, a speed value displayed alone in the one mode may be changed to as a sub display target in the other mode.

The digital display 3 may be arranged side by side with other indicator such as a pointer analog indicator. For example, the digital display 3 and an analog indicator may be arranged side by side in the horizontal direction viewed from the user.

The first to the third embodiments describe the case in which a main display target is switched in accordance with a command by the user. However, the present invention is not limited thereto, and the display mode of the speed values SP1 and SP2 may be switched in accordance with other commands and determination. For example, the vehicle may determine which of the speed values SP1 and SP2 to be a main display target based on GPS data, road traffic information, navigation data, and the like. This determination is performed by, for example, the arithmetic unit 21. In this case, the arithmetic unit 21 automatically changes a speed unit as a main display target across a boundary between a country/region in which the first speed unit is a mainly used speed unit and a country/region in which the second speed unit is a mainly used speed unit. The road traffic information is acquirable, for example, by reading a road sign by image recognition or through communication with an infrastructure side.

When the first speed value SP1 and the second speed value SP2 are corrected, it is preferable that the corrections of the two speed values SP1 and SP2 are simultaneously performed.

A vehicle display device according to the present invention can display together values of a traveling speed in two different units while reducing discomfort caused to the user.

The contents disclosed in the above-described embodiments and modifications can be executed in combination as appropriate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device for use with a vehicle that includes a vehicle speed detector, the display device comprising:
   a digital display configured to display together a first integer value representing travel speed in kilometers per unit time and a second integer value representing travel speed in miles per unit time; and
   a controller configured to,
      perform one of a first correction and a second correction when the second integer value is zero and the first integer value is positive, when the controller performs the first correction, the controller changes the first integer value from a positive value to zero so that both of the first integer value and the second integer value have a value of zero, and when the controller performs the second correction, the controller changes the second integer value from zero to a positive value so that both of the first integer value and the second integer value are positive,
      display the first integer value and the second integer value on the digital display subsequent to performing one of the first correction and the second correction.

2. The vehicle display device according to claim 1, wherein the controller is configured to perform the first corrected when the second integer value is zero and the first integer value is positive.

3. The vehicle display device according to claim 1, wherein the controller is configured to correct the second integer value to be a value identical to the first integer value when the controller performs the second correction.

4. The vehicle display device according to claim 1, wherein
   the controller is configured to cause the digital display to display one of the first integer value and the second integer value in a character size larger than a character size of an other of the first integer value and the second integer value.

5. The vehicle display device according to claim 4, wherein
   the controller is configured to perform the second correction when the first integer value has a character size that is larger than a character size of the second integer, and
   the controller is configured to correct the second integer value to be a value identical with the first integer value when the controller performs the second correction.

\* \* \* \* \*